United States Patent [19]

Eddy

[11] 4,144,991
[45] Mar. 20, 1979

[54] FILM TENSIONING DEVICE
[75] Inventor: Richard P. Eddy, Gardena, Calif.
[73] Assignee: Christie Electric Corp., Los Angeles, Calif.
[21] Appl. No.: 840,815
[22] Filed: Oct. 11, 1977
[51] Int. Cl.² ............................................ B65H 23/08
[52] U.S. Cl. .................................. 226/195; 226/102; 352/182
[58] Field of Search ......................... 226/195, 39, 102; 352/182

[56] References Cited
U.S. PATENT DOCUMENTS

| 2,091,692 | 8/1937 | Scott | 226/195 X |
| 2,865,475 | 12/1958 | MacMillin | 352/182 X |
| 3,330,458 | 7/1967 | Bentzman | 226/187 X |
| 3,951,324 | 4/1976 | Pundsack | 226/195 |

Primary Examiner—Richard A. Schacher
Attorney, Agent, or Firm—Harris, Kern, Wallen & Tinsley

[57] ABSTRACT

A film tensioning device for maintaining tension in the film in a film transport system such as a motion picture projector. A tension roller mounted between pressure rollers with the film running over the tension roller, with a spring urging the pressure rollers against the film to prevent slippage of the film on the tension roller. A curved spring carried within the tension roller and engageable with a stop providing sliding friction with the tension roller. The spring is readily removable for substitution of a different spring to provide a different magnitude of tension in the device.

10 Claims, 5 Drawing Figures

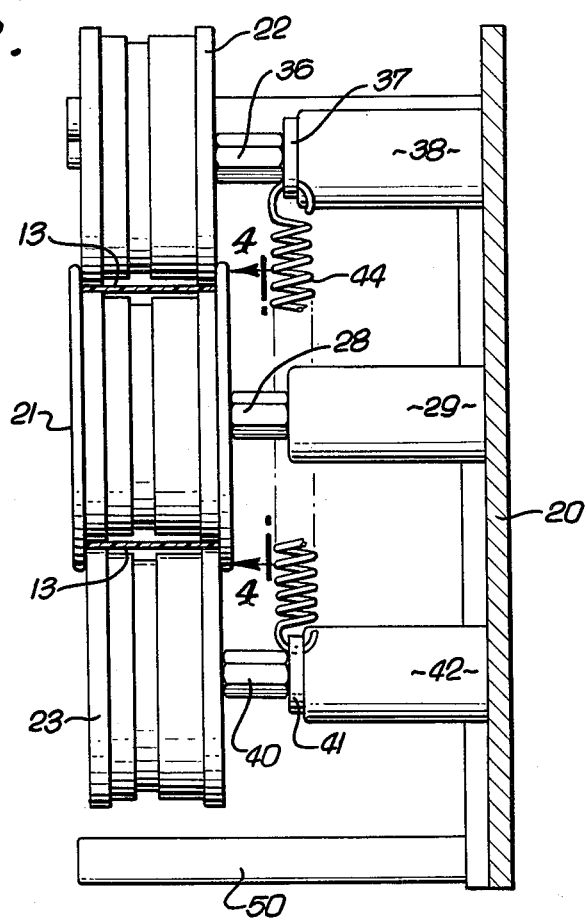
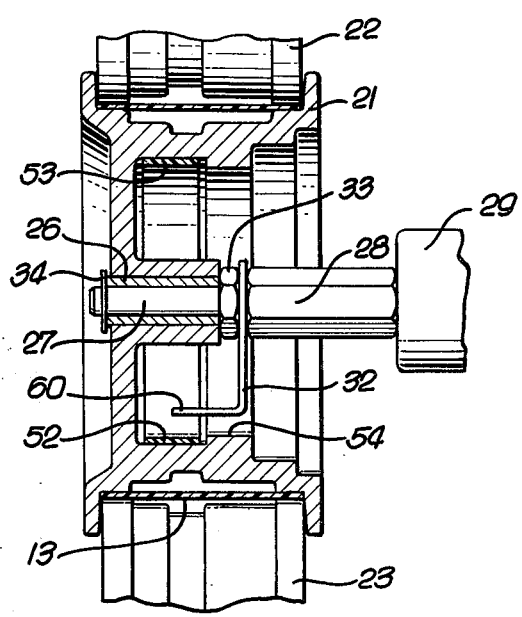
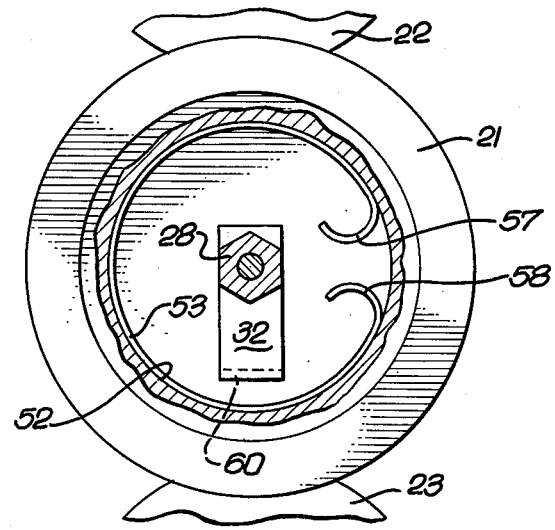

FILM TENSIONING DEVICE

BACKGROUND OF THE INVENTION

This invention relates to a film tensioning device suitable for use in film transport systems, such as motion picture film projectors. The film tensioning device is utilized to provide a uniform or substantially uniform tension in the film while the film is being transported, such as from a first reel through a drive system and a projector and onto a second reel. The film tensioning device may also be used to isolate portions of a film path in a transport system so that vibrations induced in the film in one section will not be transmitted to film in another section.

In the past, pressure clutch mechanisms have been used for film tensioning. In a typical device, a felt disk is positioned between a stationary member and a rotating member, with a spring positioned for pressing the felt disk between the two members to provide a drag on the rotating member. The spring pressure and therefore the drag may be adjusted by an adjustment nut which compresses the spring. A film roller or sprocket may be mounted on a shaft with the rotating member to produce the tension in the film.

SUMMARY OF THE INVENTION

The film tensioning device of the present invention is utilized for maintaining tension in the film in a film transport system. The device includes a base with a tension roller and one or more pressure rollers mounted thereon. In the preferred embodiment, two pressure rollers are carried on pivoting arms with the arms joined by a spring bringing the pressure rollers into contact with the film on the tension roller for the purpose of preventing film slippage around the tension roller.

A tension member, typically a spring, is carried in the tension roller in slidable relation with the tension roller. The tension member engages a stop on rotation of the tension roller which limits movement of the tension member and produces a friction drag between the tension member and the tension roller.

Provision is made for substituting one tension member for another to provide adjustment of the amount of tension introduced in the film by the device.

BRIEF DESCRIPTION OF THE DRAWINGS

FIG. 3 is a sectional view taken along the line 3—3 of FIG. 2;

FIG. 4 is an enlarged partial sectional view taken along the line 4—4 of FIG. 3; and FIG. 5 is a sectional view taken along the line 5—5 of FIG. 4.

DESCRIPTION OF THE PREFERRED EMBODIMENT

Figure 1:
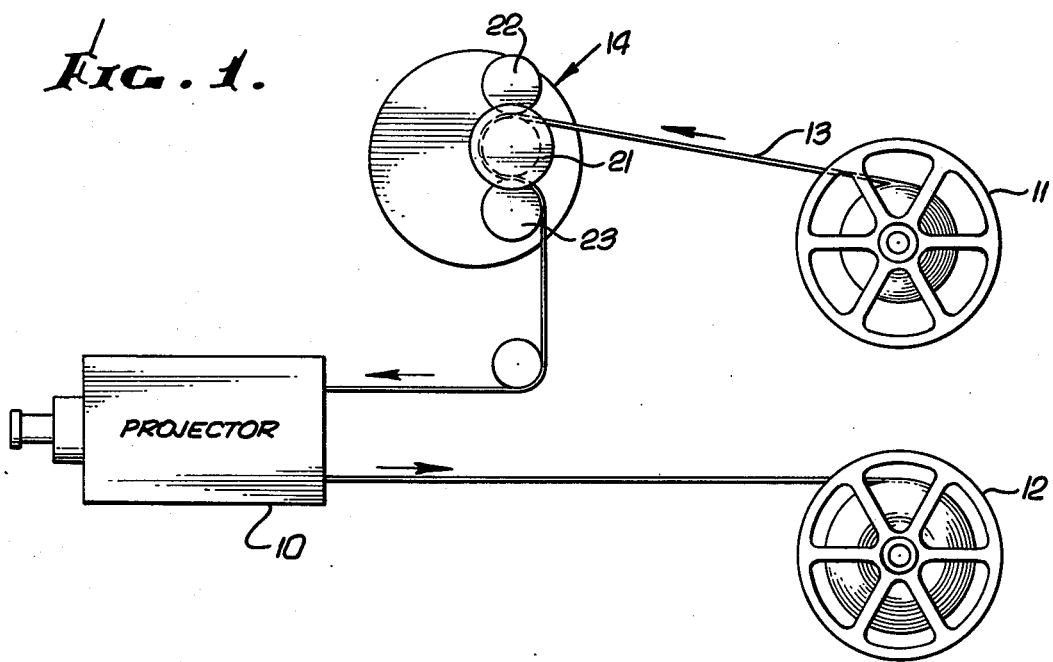
FIG. 1 is a diagram illustrating the film tensioning device of the present invention incorporated in a film transport system for a motion picture projector.
Figure 2:
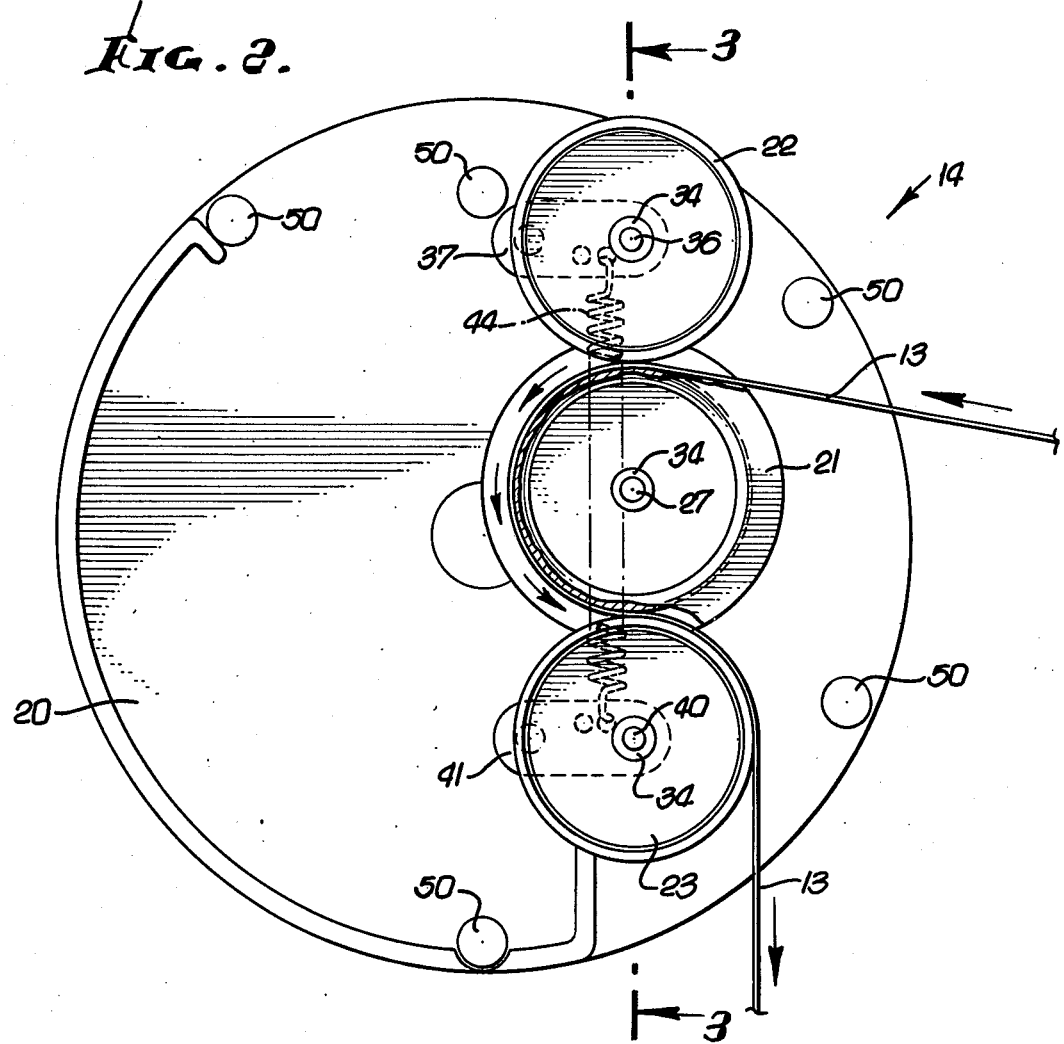
FIG. 2 is an enlarged plan view of the film tensioning device of FIG. 1.

FIG. 1 illustrates a typical film transport system with a motion picture projector 10, a feed reel 11 and a take up reel 12. The film 13 runs from the feed reel 11, through a film tensioning device 14 and the projector 10 to the take up reel 12.

The film tensioning device 14 includes a base plate 20 with a tension roller 21 and pressure rollers 22, 23.

As shown in FIG. 3 and 5, the tension roller 21 rotates on a sleeve 26 which in turn is mounted on a shaft 27 of a post 28 which is threaded into a boss 29 of the base plate 20. An angle stop bracket 32 is also carried on the post 28 and held in place by a nut 33. A snap ring 34 holds the sleeve 26 in position.

The pressure roller 22 is similarly mounted on a post 36 carried on an arm 37 which in turn is pivotally mounted on a boss 38 of the base plate 20. The pressure roller 23 is similarly mounted on a post 40 carried on an arm 41 pivoting on a boss 42. A spring 44 interconnects the arms 37, 41 urging the pressure rollers 22, 23 toward the tension roller 21, with the film 13 being threaded around the tension roller between the pressure rollers. The film may follow various configurations, and bosses 50 on the plate 20 serve as film guides.

In the preferred embodiment illustrated, an inner cylindrical section 52 is provided in the tension roller 21. A spring 53 is positioned within this cylindrical section 52, the spring preferably being a strip bent into a curved configuration. Another inner section 54 of lesser diameter than the section 52 may be provided for retaining the spring within the tension roller.

The spring 53 preferably is a single piece with inwardly turned ends 57, 58. The spring is readily inserted and removed by gripping it at the ends and bringing the ends together.

The spring 53 and the stop bracket 32 are designed so that they inter-engage when the roller 21 rotates, thereby limiting rotational movement of the spring. In the simple arrangement illustrated in FIGS. 4 and 5, end 60 of the stop bracket 32 projects into the interior of the spring and is readily engaged by the spring ends 57, 58. This end portion 60 of the stop bracket preferably is made wider than the gap between the spring ends 57, 58 so that the stop will not be positioned between the spring ends when the roller is mounted.

In operation, the pressure rollers pinch the film against the tension roller, maintaining contact of the film on the tension roller to prevent slippage of the film with respect to the tension roller. The radius of curvature of the spring 53 is greater than the inside diameter of the section 52 of the tension roller so that the spring exerts a pressure on the iner wall of the roller. The magnitude of the pressure may be varied by changing the spring rate or the initial curvature, and springs providing different pressures are readily substituted to provide different amounts of tension. In operation, the tension roller 21 will rotate in the direction of motion of the film until the spring engages the stop, after which the tension roller 21 will continue to rotate with the spring-roller sliding engagement providing a resistance to rotation and thereby a tension in the film.

The rollers are readily changed by removing the snap rings 34. When the roller 21 is removed, the spring is readily changed. Various springs may be utilized for varying the tension. Also, various diameters of roller may be utilized. Also, the gripping pressure provided by the pressure rollers can be changed by changing the spring 44 and/or changing the location of the ends of the spring in the arms 37, 41.

I claim:

1. In a film tensioning device for maintaining tension in the film in a film transport system, the combination of:

a base;

a tension roller having a periphery for receiving film;
pressure roller means;

means for mounting said tension roller and said pressure roller means on said base with said pressure roller means adjacent said tension roller for urging film against said tension roller periphery;

a stop mounted on said base; and a tension member carried in said tension roller in slidable relation, and engageable with said stop on rotation of said tension roller, independently of the speed of rotation of said tension roller.

2. A film tensioning device as defined in claim 1 wherein said mounting means includes an arm pivotally mounted on said base, with said pressure roller means carried on said arm, and a spring engaging said arm and urging said arm toward said tension roller.

3. A film tensioning device as defined in claim 1 wherein said pressure roller means includes first and second pressure rollers, and said mounting means includes first and second arms pivotally mounted on said base on opposite sides of said tension roller, with a pressure roller carried on each arm, and a tension spring interconnecting said arms and urging both arms toward said tension roller.

4. In a film tensioning device for maintaining tension in the film in a film transport system, the combination of:

a base;

a tension roller having a periphery for receiving film; pressure roller means;

means for mounting said tension roller and said pressure roller means on said base with said pressure roller means adjacent said tension roller for urging film against said tension roller periphery;

a stop mounted on said base; and a tension member carried in said tension roller in slidable relation, and engageable with said stop on rotation of said tension roller, said tension member including a spring member providing a friction engagement between said tension member and said tension roller.

5. A film tensioning device as defined in claim 4 wherein said spring member comprises a curved spring positioned within said tension roller.

6. A film tensioning device as defined in claim 5 wherein said curved spring has an end section projecting inward for engagement with said stop.

7. A film tensioning device as defined in claim 5 wherein said curved spring is compressible for insertion and removal from said tension roller for substituting different springs in said tension roller.

8. A film tensioning device as defined in claim 4 wherein said tension roller has a cylindrical inner section, and said spring member comprises a curved strip spring in engagement with said cylindrical section.

9. A film tensioning device as defined in claim 8 wherein said spring is compressible for insertion into and removal from said cylindrical section.

10. A film tensioning device as defined in claim 8 wherein said spring has inwardly turned ends engageable with said stop, with the spacing between said ends less than the width of said stop.

* * * * *